US011427993B2

United States Patent
Bello Larroche (10) Patent No.: US 11,427,993 B2
(45) Date of Patent: Aug. 30, 2022

(54) CARTRIDGE FOR ELECTRONIC TAP WITH A HANDLE HAVING AN EXTENDED OPERATIVE RANGE OF MOTION, ELECTRONIC TAPE INCLUDING SAME, AND THE OPERATION METHOD THEREOF

(71) Applicant: SEDAL, S. L.U., Sant Andreu de la Barca (ES)

(72) Inventor: Rafael Bello Larroche, Martorell (ES)

(73) Assignee: SEDAL, S.L.U., Sant Andreu de la Barca (ES)

( * ) Notice: Subject to any disclaimer, the term of this patent is extended or adjusted under 35 U.S.C. 154(b) by 0 days.

(21) Appl. No.: 17/433,698

(22) PCT Filed: Feb. 24, 2020

(86) PCT No.: PCT/ES2020/070133
§ 371 (c)(1),
(2) Date: Aug. 25, 2021

(87) PCT Pub. No.: WO2020/174111
PCT Pub. Date: Sep. 3, 2020

(65) Prior Publication Data
US 2022/0042290 A1 Feb. 10, 2022

(30) Foreign Application Priority Data
Feb. 25, 2019 (ES) .............................. ES201930155

(51) Int. Cl.
E03C 1/04 (2006.01)
E03C 1/05 (2006.01)
(Continued)

(52) U.S. Cl.
CPC ............ *E03C 1/0412* (2013.01); *E03C 1/055* (2013.01); *F16K 19/006* (2013.01);
(Continued)

(58) Field of Classification Search
CPC ...... F16K 19/006; F16K 31/605; E03C 1/055; E03C 1/0412; G05D 23/1919; G05D 23/1925
See application file for complete search history.

(56) References Cited

U.S. PATENT DOCUMENTS

2006/0130908 A1* 6/2006 Marty ................. F16K 37/0041
137/613
2013/0014844 A1* 1/2013 Davidson ................ F16K 31/02
137/625.41
(Continued)

OTHER PUBLICATIONS

International Search Report for PCT Application No. PCT/ES2020/070133; European Patent Office; Rijswijk, Netherlands; dated Sep. 22, 2020.
(Continued)

*Primary Examiner* — Atif H Chaudry
(74) *Attorney, Agent, or Firm* — Thomas E. Lees, LLC (57) ABSTRACT

The present invention relates to a cartridge for an electronic tap having a handle or controller with an extended operative range of motion, which allows moving said handle or controller beyond its normal range of motion determined by a first stop, providing in said extended areas additional functionalities using a control system that determines the position of the handle in order to associate to said position a flow value, a fluid mixing ratio value, and/or an additional functionality. The invention also relates to the tap including said cartridge with a handle having an extended operative range of motion and to the operation method thereof.

15 Claims, 5 Drawing Sheets

(51) Int. Cl.
*F16K 11/00* (2006.01)
*F16K 31/60* (2006.01)
*F16K 37/00* (2006.01)
*G05D 23/19* (2006.01)

(52) U.S. Cl.
CPC ........ *F16K 31/605* (2013.01); *F16K 37/0041* (2013.01); *G05D 23/1919* (2013.01); *G05D 23/1925* (2013.01)

(56) References Cited

U.S. PATENT DOCUMENTS

| | | |
|---|---|---|
| 2015/0299991 A1 | 10/2015 | Prabhakar et al. |
| 2018/0106022 A1* | 4/2018 | Kamiyoshi ............. G01P 15/18 |
| 2019/0101219 A1* | 4/2019 | Hatakeyama ........... E03C 1/057 |

OTHER PUBLICATIONS

Written Opinion of the International Searching Authority for PCT Application No. PCT/ES2020/070133; European Patent Office; Rijswijk, Netherlands; dated Sep. 22, 2020.

* cited by examiner

CARTRIDGE FOR ELECTRONIC TAP WITH A HANDLE HAVING AN EXTENDED OPERATIVE RANGE OF MOTION, ELECTRONIC TAPE INCLUDING SAME, AND THE OPERATION METHOD THEREOF

CROSS-REFERENCE TO RELATED APPLICATIONS

This is a § 371 National Stage Entry application of International Application Serial No. PCT/ES2020/070133, filed Feb. 24, 2020, which claims the benefit of Spanish Application No. P201930155, filed on Feb. 25, 2019, the disclosures of which are hereby incorporated by reference.

The present invention relates to a cartridge for an electronic tap with an extended operative range of motion that allows moving the handle or lever of the tap in which it is installed beyond its normal operation range determined by a first stop. The invention also relates to the tap including said cartridge with a handle having an extended operative range of motion and to the operation method thereof.

BACKGROUND

The prior art for taps actuated manually by a handle or lever includes numerous taps that transfer said actuation of the handle or lever to an inner mechanical cartridge that performs the mixing ratio of the fluids and controls the flow.

In taps lacking said mechanical cartridge system, which are modified to control electronically the mixing ratio of the fluids and the flow regulation but which continue to include a handle or lever actuated manually by the user, a system is used for detecting the position of the handle or lever in order to transmit the control parameters associated with said detected position to the electronic systems for controlling the fluid mixture and flow.

Among these taps with a mechanical operation cartridge are known taps having manually actuated handles which, in addition to having conventional ranges of motion in the rotation and inclination axes, have an extended operative range that allows moving the handle beyond the conventional end of said range by overcoming a resistance to passing said end of the range.

These extended operative ranges generally allow dispensing a third fluid or stopping the fluid supply immediately, providing the tap with additional functionalities to those of conventional taps. Activation of this additional function in known taps with this feature continues while the user maintains the handle within the extended operative range, which requires applying continuous pressure on the handle or providing a mechanism in the handle that holds it temporarily in said extended range position.

These extended ranges are provided only in one of the axes, overcoming the resistance that limits the normal operation of the tap; this first stop is determined by a normally elastic piece which reaches the end of the range of motion, such that the two stops rely on this same piece.

BRIEF SUMMARY

The aim of the present invention is to provide a cartridge for an electronic tap with an extended operative range of motion to perform additional functions. A further aim of the invention is the electronic tap including same and the operation method thereof, which allows configuring a novel and advantageous product with the advantages over the prior art described below.

According to the aim of the invention, in a first aspect thereof, the present invention provides a cartridge for an electronic tap with an extended operative range of motion, to which is coupled a handle or lever with a rotational and tilting motion for manually regulating the outlet parameters of the flow in the tap in which the cartridge is installed, and wherein the cartridge receives the movement of said handle or controller through a cam that moves together with the handle or controller.

This cartridge is characterised by having at least:
- a tilting range of motion for the cam that is connected to the handle which is provided, at least at one of the ends of said cam elevation range, with a passable stop formed by an element which at a first point in the path presents a certain resistance to continuing in said direction of displacement, and after applying a greater force than in the usual displacement of the cam, sufficient to overcome said resistance, continues moving said cam in said direction along a segment of increased path range until a non-passable end of path range, and wherein the force exerted by said resistance to overcome the stop continues throughout the displacement in the increased path range and is enough to return said cam to said first point in the range of motion when the user ceases to act on said handle or controller.
- a rotational range of motion for the cam that is connected to the handle which is provided, at least at one of the ends of said cam rotational range, with a passable stop formed by an element which at a first point in the path presents a resistance to continuing in said direction of displacement, and after applying a greater force than in the usual displacement of the cam, sufficient to overcome said resistance, continues moving said cam in said direction along a segment of increased path range until a non-passable end of range, and wherein the force exerted by said resistance to overcome the first stop continues throughout the displacement in the increased path range and is enough to return said cam to said first point in the range of motion when the user ceases to act on said handle or lever.
- an electronic control system provided with at least some means for detecting the position of the handle or lever at the different points in the range of motion of each of the displacement axes thereof—tilting and rotational motion—and also having at least some processing means that receive the information on the position of the cam and act on the means for regulating the mix and the flow of the fluid, as well as additional functions in the positions located within the extended ranges.

These features of the invention make it possible to have a cartridge with extended ranges in both the rotational and tilting motions, wherein the handle is moved beyond its conventional positions in the normal control by the user of the flow and temperature regulation ranges.

The provision of multiple extended operative ranges in both the motions of the cam connected to the handle make it possible to have various additional functions associated with each one of the extended path ranges by the use thereof in an electronic tap that can manage these multiple inputs in extended path ranges, discriminate between them, and associate them with several additional functions. This configuration is achieved by the inclusion of at least two sets of passable stops and end of path range stops in a single cartridge.

In a possible embodiment of the invention the end of range of motion stops are provided by the geometry of the cartridge components being different from that of those providing the passage stop function, by said geometries entering in contact such that movement in said direction is prevented.

By separating the elastic stop from the end of range stop it is possible to create systems that provide independent regulation of the position of the passable stop with respect to the end of range stop. This allows preventing appreciable changes in the position of the passable stop due to deformations caused by extraordinary loads on the end of range stop due to abuse during the useful lifetime of the cartridge.

Alternatively to the above, the end of range stop can be established by geometries of the cartridge component that establish the same passable stop, by contact between said geometries, preventing further motion in said direction.

In another possible embodiment of the invention that combines the aforementioned embodiments, the set of end of range stops for the various ends of the motion of the handle or controller is provided by geometries of the cartridge components that establish the same passable stop and/or by geometries of the cartridge components different from those establishing the passable stop function, by contact between these geometries, preventing further motion in said direction.

In a preferred embodiment of the invention, the passable stops in the tilting range of motion of the cam correspond to a terminal connected to a compression spring, with a preload such that the force required is greater than that for moving the cam in the normal tilting range of motion in order to overcome the resistance to motion provided by said spring and accessing the extended operative range of motion. Moreover, the tilting end of range of motion stop is established by the contact between the moving disc of the cartridge that displaces the cam with a point in the cartridge that is static with respect to the motion in the tilting plane of the cam.

In another preferred embodiment of the invention, the passable stops in the range of motion of the cam are the two terminals connected to either a spring plate or a preloaded coil spring, where each terminal is embedded or arranged in a part integrally joined to the rotation of the cam such that in its rotation, when one of said terminals contacts a stop geometry at a static part of the cartridge, a force greater than that for moving the cam in the normal rotational range of motion is required to overcome the resistance to continuing said motion provided by said spring and begin said extended range of motion, while the rotational end of range stop is established by contact between a geometry in the form of a protrusion of the piece joined to the cam rotation and a geometry of the static walls of the cartridge that is interposed preventing continuing the motion of said protrusion.

Preferably, the tap has extended ranges of motion in the two rotational directions of motion of the cam and the two tilting directions of motion of the cam. This embodiment of the invention with extended ranges of motion in both ends of both possible motions allows providing the tap with multiple additional functionalities at each end of the ranges of motion when the first stop is passed and the extended range of motion is entered, such that the user can enjoy several possible actuations of said functionalities in each extended range of motion used.

According to another alternative embodiment of the invention the cartridge has means for detecting the position of the cam consisting in at least a triaxial magnetic sensor placed in a static disc of the cartridge and a magnetic field generating element that moves together with the cam.

This option incorporates a system for detecting the position of the handle, both in the positions corresponding to the conventional ranges of motion and in the positions of the handle in the extended ranges of motion, and uses the detection of the magnetic field intensity in the three Cartesian axes to determine both the angular orientation of the magnetic field generating element and therefore the rotation angle of the handle, and the position along the tilting range of motion.

Preferably, the triaxial magnetic sensor is placed on a static base of the cartridge with one of the three detection Cartesian axes essentially coaxial or parallel to the axis of rotation of the handle or controller of the cartridge; and where the position of the magnetic field generating element when the handle or lever in its tilting range of motion is approximately at the middle of its range is placed essentially centred on said axis of rotation of the handle or lever of the cartridge, and therefore also essentially centred on the corresponding Cartesian axis of detection essentially coaxial or parallel to said axis of rotation of the handle or lever of the cartridge.

The alternative described above allows obtaining a symmetrical pattern in the magnetic field intensity measured in the movements corresponding to the tilting and rotation ranges of motion of the magnetic field generating element with respect to the central position of inclination of the handle or lever and the position of triaxial magnetic sensor, improving the use of the available range of measurement of the sensors, advantageously symmetrical for positive and negative intensities, improving the resolution and accuracy of measurement throughout the entire range of positions, particularly in the extreme positions corresponding to the positions of the handle in the extended ranges, and simplifying subsequent calculations to relate the measurements of the triaxial magnetic sensor with the tilting and rotational positions of the handle or lever in said positions.

According to this embodiment incorporating a system for detecting the position of the handle by a triaxial magnetic sensor, and for other alternative detection systems, the processing means in the extended range of motion areas near the passable stop, defined as safety areas, do not determine a new parametrisation of the fluid and do not execute an auxiliary specific function.

This absence of a change in the parametrisation values at positions near the passable stop in the extended range areas allows preventing unintended actuation of the additional functions assigned to said extended ranges.

Also according to the aim of the invention, according to a second aspect, the present invention provides an electronic tap containing a tap cartridge with an extended operative range of motion as that indicated in the preceding features of the present description. Said tap is characterised in that the handle or controller of the tap that is joined to the cartridge cam has extended operative ranges in the possible axes of motion of the handle or controller, and electronic detection means for the position of said handle or controller, where the tap is provided with operative positions that correspond to:
  the conventional displacement positions of the handle in any of the axes of motion before the resistance points at the end of each range of motion, considering these the usual operative range positions
  the extended operative range of motion positions at least in:
    either an extended area corresponding to an extended range of motion of the tilting axis of the handle;
    or an extended area corresponding to an extended range of motion of the rotation axis of the handle; and/or an extended area corresponding to an extended range of motion of both the tilting and the rotation axes of the handle.

The electronic tap is also characterised in that between the various detection areas of the conventional and extended range positions, there are safety areas where there is no assigned parametrisation of the fluid nor an auxiliary function.

In this embodiment the electronic tap, through the control system thereof, establishes a measurement area of the position in the transition between the passable stop and the end of range stop, in the extended range segment, where the configuration of the fluid mixture and fluid flow is unchanged and the existing functions are neither activated nor disabled, as a safety measure against accidental actuations by the user, tolerances and hysteresis of the kinematic chain and the resolution of the electronics.

According to another aim of the invention, according to a third aspect, the present invention provides an operation method for an electronic tap as indicated above containing a tap cartridge with an extended operative range as that also indicated in the present description. The method is characterised in that the electronic control system of the tap receives the measurement of the detection means carries out at least the following steps:
  determining the position of the handle to which a fluid flow value and fluid mixing ratio are assigned if it is in the conventional operative range;
  determining the position of the handle to which a fluid flow value and fluid mixing ratio are assigned, and/or an auxiliary function, if it is in the extended operative range end area;
  discarding changing the previous operating features if the position of the handle is detected to be in one of the safety areas between the conventional range positions and the end positions of the extended range;
  discarding measurements that determine a position caused by rebounds in the returns of the extended areas, accidental multiple actuations or interferences/influences external to the tap.

Optionally, the auxiliary functions are performed by entering the extended range areas with an actuation pulse, without having to maintain pressure on the handle, or by keeping the handle in said area while the function is applied, where a different auxiliary function can be assigned to each type of actuation performed on the handle.

Also optionally, each of the extended range areas is further divided into various subareas according to the entry point determined by the position of the handle or controller in each different degree of liberty in which the extended area is entered, to provide the tap with additional functionalities according to whether the position is in one extended range subarea or another.

This allows providing, if so desired, a plurality of functions within a single extended range, either by the way in which said extended range is entered or by which area is entered with a given movement, whether tilting or rotation.

Preferably, the auxiliary functions executed by the tap control system or the execution commands sent to associated external elements are at least one or more of those described below, or combinations thereof:
  supply of a specific volume of fluid;
  supply of a specific flow of fluid;
  supply of fluid in a specific mixing ratio;
  cancelling the auxiliary functions being executed;
  programming operation parameters;
  changing the default regulation range of the tap (flow, temperature);
  selecting supply of one of the fluids supplied independently
  recalibrating passable stops and ends of range
  resetting the electronic tap to factory values.

As an option for the aforementioned embodiments, the method of operation includes the sending, by the processing means, of acknowledgement, reply and information signals to the user regarding both the execution of the auxiliary functions associated with the extended ranges, and the regulation selected in the execution of the usual positions of the handle or controller using display means of the tap itself and/or external to it with luminous, alphanumerical and/or audible signals. This provides users with a visual and/or acoustic confirmation of the parametrisation set by them while operating the handle in both conventional ranges and in the extended ranges in which additional functions are assigned such as those described above.

BRIEF DESCRIPTION OF THE SEVERAL VIEWS OF THE DRAWINGS

In order to better understand the description made, a set of drawings has been provided which, schematically and solely by way of non-limiting example, represents practical cases of embodiment.

DETAILED DESCRIPTION

Figure 1:
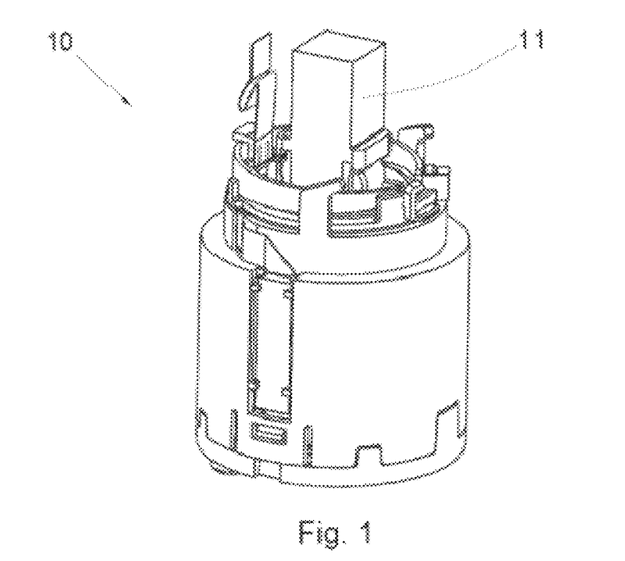
FIG. 1 is a perspective view of the cartridge with an extended operative range for the handle.
Figure 2:
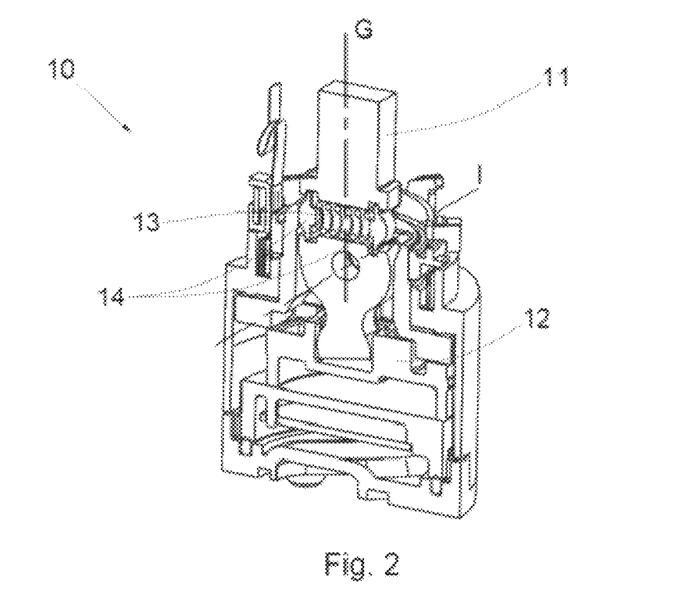
FIG. 2 is a longitudinal sectional perspective view along the axis of rotation of the handle of the cartridge with extended operative range.
Figure 13:
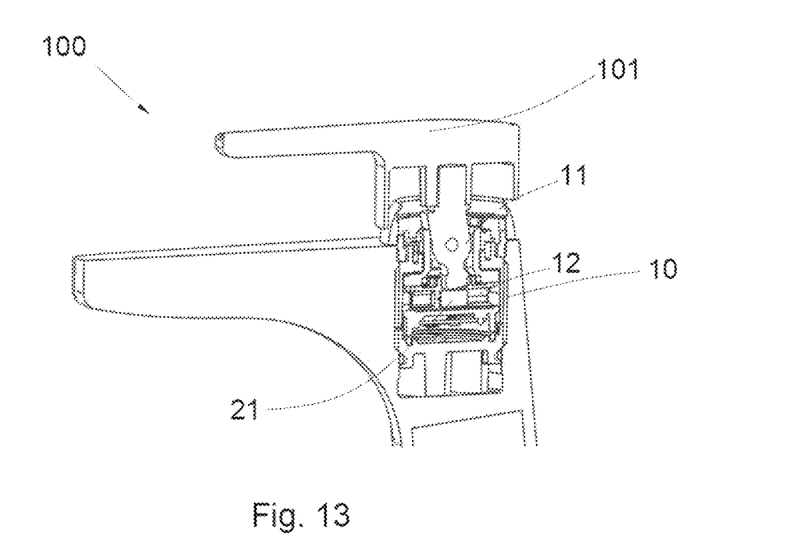
FIG. 13 is a longitudinal sectional perspective view along the axis of rotation of the handle of the cartridge with extended operative range installed in an electronic tap.

In the present preferred embodiment of the invention, as can be seen in FIGS. 1, 2 and 13, a cartridge (10) is installed in an electronic sanitary water mixing tap (100) that is provided with a handle (101) with which the user regulates the mixing ratio of hot and cold water and the supply flow.

The handle (101) is connected to a cam (11) to which the movement thereof is transmitted and that performs the rotation and tilting movements, with the same axis of rotation (G) as the handle (101) in the rotation motion thereof, and the same axis of rotation (I) as the handle (101) in the tilting motion thereof.

The cam (11) is integrally joined to a moving disc (12) or the like that acts as a kinematic chain joined to the motion of the handle (101), executing the motion on a plane defined between the walls of the cartridge (10).

Figure 3:
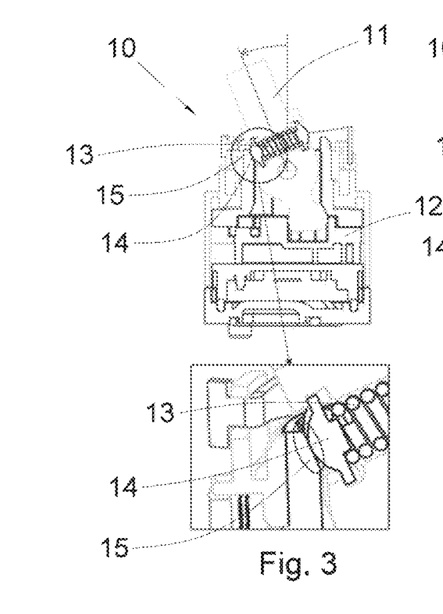
FIG. 3 is a partial longitudinal sectional view of the passable stop mechanism and an enlarged view of the end of range stop for the handle tilting motion, with the handle at an extreme point of the conventional range in which the passable stop is acting.
Figure 4:
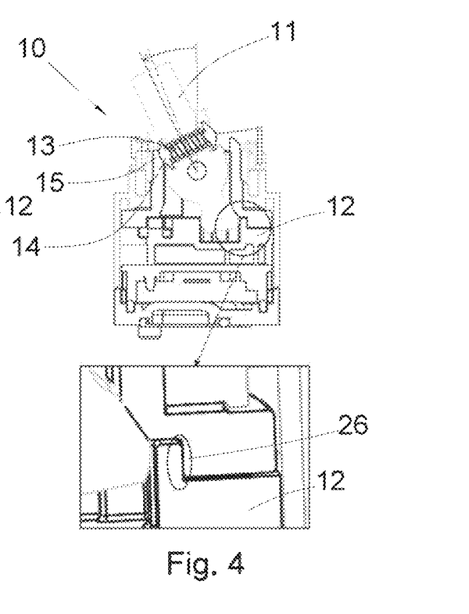
FIG. 4 is a partial longitudinal sectional view of the passable stop mechanism and an enlarged view of the end of range of the handle tilting motion, with the handle at the end of the extended range in which the end of range stop is acting.
Figures 5, 6:
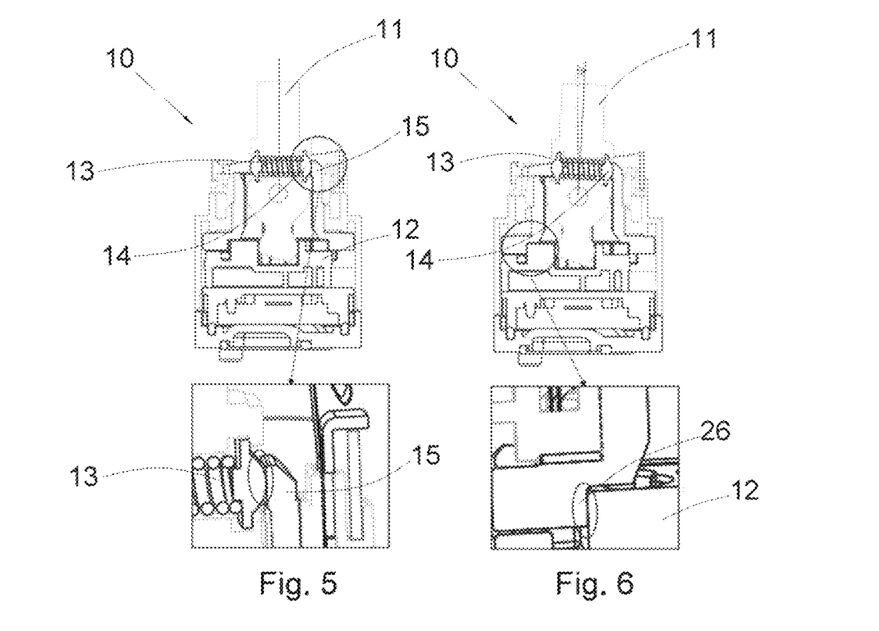
FIG. 5 is a partial longitudinal sectional view of the passable stop mechanism and an enlarged view of the end of range of the handle tilting motion, with the handle at the other extreme of the conventional range in which the passable stop is acting.
FIG. 6 is a partial longitudinal sectional view of the passable stop mechanism and an enlarged view of the end of range of the handle tilting motion, with the handle the end of the other extended range in which the end of range stop is acting.

As can be seen in FIGS. 2 to 6, the cam (11) is provided with an elastic element, in this case a preloaded compression spring (13) with stops (14) at the ends thereof, said spring (13) being placed on the plane of the tilting motion, such that the stops (14) contact static retention geometries of the bushing (15) of the cartridge (10), with respect to the elevation motion of the cam (11) in the conventional flow regulation positions, between the maximum flow aperture, FIG. 3, and the closing of the flow, FIG. 5. In these positions and in the intermediate positions the spring (13) does not exert any force on the retention geometries of the bushing (15).

When said ends of the tilting range are reached, upon the stops (14) contacting the retention geometries of the bushing (15), the handle (101) can continue its tilting motion along the direction in which said contact with the retention geometries of the bushing (15) has been reached, overcoming the force exerted by the spring (13) against advancing in this direction, increasing the compression of the spring (13) and therefore its potential energy.

This tilting motion that is transformed in the present invention into a translational motion of the mobile disc (12) ends at the extended range when the mobile disc (12) contacts a physical end of range stop, such as a static wall (26) of the bushing (15) of the cartridge (10) with respect to the lifting motion of the cam (11).

When the user stops applying pressure on the handle (101) in the direction in which the stop (14) has been passed with the retention geometries of the bushing (15), the potential energy stored in the spring (13) makes the cam (11) return automatically to the position in its end of the conventional tilting range of motion.

Figure 7:
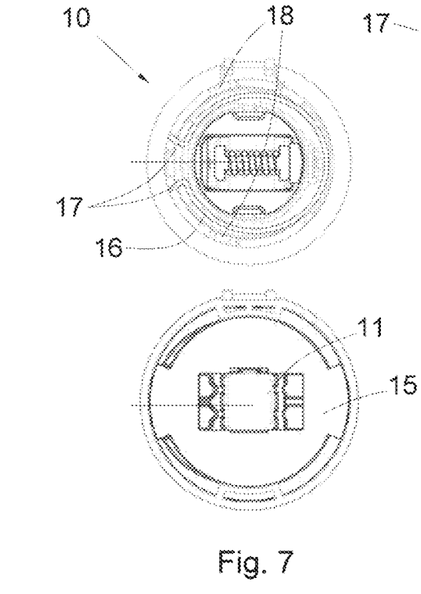
FIG. 7 is a cross-sectional view of the passable stop mechanism and an enlarged view of the end of range stop for the handle rotation motion, with the handle at a central point of the conventional rotation range in which no passable stop is acting.
Figure 8:
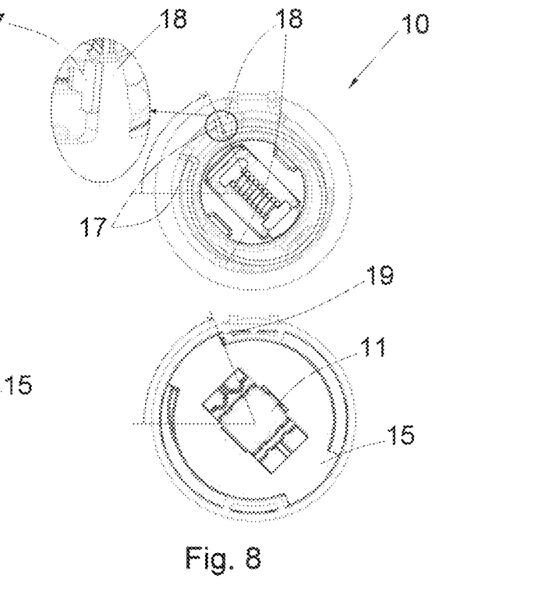
FIG. 8 is a cross-sectional view of the passable stop mechanism and an enlarged view of the end of range stop for the handle rotation motion, with the handle at an extreme point of the conventional rotation range in which the passable stop is acting.
Figure 9:
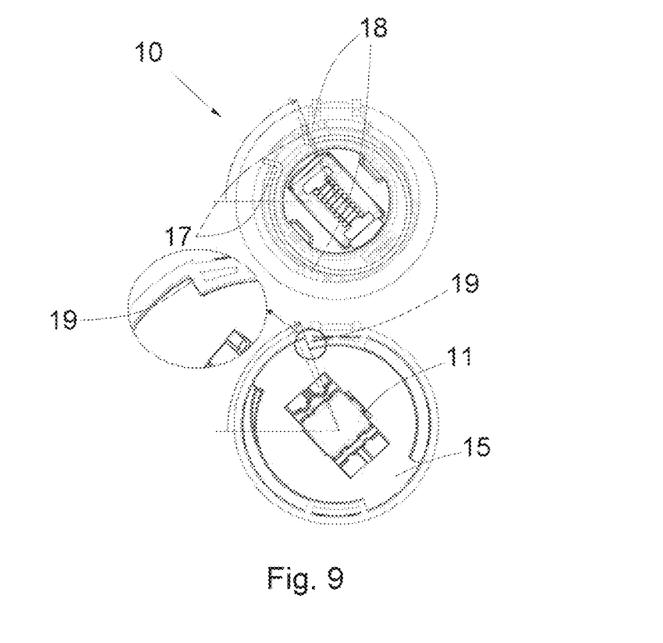
FIG. 9 is a cross-sectional view of the passable stop mechanism and an enlarged view of the end of range of the handle rotation motion, with the handle at the end of the extended rotation range in which the end of range stop is acting.

In a similar manner, as shown in FIGS. 7 to 9, the cam (11) has an elastic element, in this case a preloaded spring plate (16), with stops (17) at its ends, said spring plate (16) being located at the outer perimeter of the rotational motion of the bushing (15) where the cam (11) is joined to the mobile disc (12) in said rotational motion, such that the stops (17) are in the bushing (15), contacting static retention geometries (18) of the cartridge (10) at the conventional hot and cold water mixing regulation positions that are at the ends of the maximum temperature regulation, FIG. 8, and the minimum temperature regulation, not shown as it is analogous in the opposite direction. At these end positions and at the intermediate positions the spring plate (16) does not exert any force on the retention pieces (18).

When said ends of the rotation range are reached, upon the stops (17) contacting the retention geometries (18), the handle (101) can continue its rotation motion along the direction in which said contact with the retention geometries of the bushing (18) have been reached, overcoming the force exerted by the spring plate (16) against advancing in this direction, increasing the bending of the spring plate (16) and therefore its potential energy.

This rotation displacement which in the present embodiment is transformed into a rotational motion of the bushing (15) ends in the extended range when a geometry of said bushing (15) about which the cam (11) turns in its rotation motion eventually contacts an end of range stop, such as a static wall (19) of the cartridge (10).

When the user stops applying pressure on the handle (101) in the direction in which the stop (17) has been passed with the retention geometry (18), the potential energy stored in the spring plate (16) makes the cam (11) return automatically to the position in its end of the conventional rotation range of motion.

Alternatively, the end of range stops for the rotation and the tilting motion can act on the same part that establishes the passable stop. Passable stops and end of range stops for the displacement can be disposed in the same cartridge (10) in different pieces, in the same piece, or both solutions may be disposed in one or another end of extended range stop for the same tap.

Figure 12:
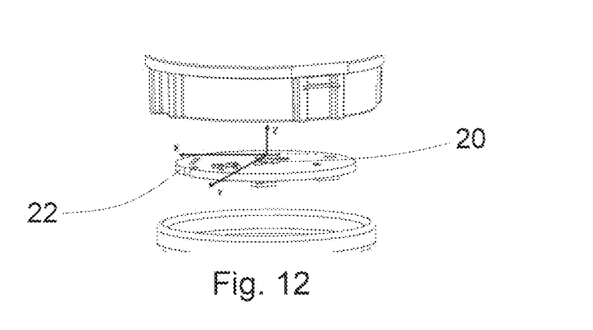
FIG. 12 is an enlarged perspective view of the location of the magnetic sensor in the cartridge.

The cartridge has control means embodied, as shown in FIGS. 12 and 13, by a triaxial magnetic sensor (20) with processing means for the measurements taken by said sensor of the magnetic field intensity generated by a magnet (21) fitted in the mobile disc (12) and which therefore moves together with said mobile disc (12).

Determining the position of the magnet with each regulation movement made by the user on the handle requires regulation parameters for the hot and cold mixing ratio and the overall supply flow. These positions and the associated regulation are transmitted to the means in charge of electronically regulating said water mixing and flow.

For a correct and reliable determination of the position of the magnet (21) and therefore of the handle (101), the triaxial magnetic sensor (20) is housed in a static base (22) of the cartridge (10) with one (Z) of the three detection Cartesian axes (X, Y, Z) essentially coaxial or parallel to the axis of rotation (G) of the handle (101) of the cartridge (10), wherein the position of the magnet (21) when the handle (101) in its tilting range of motion is approximately at the middle of the range is essentially centred on said axis of rotation (G) of the handle (101) of the cartridge (10), and therefore also essentially centred on the corresponding Cartesian axis (Z) of detection essentially coaxial or parallel to said axis of rotation (G) of the handle (101) of the cartridge (10).

Alternatively, other conventional means for detecting the position of the tilting and/or rotation of the handle (101) are possible.

The processing means, in the extended range areas near the passable stop, defined as safety areas, do not determine a new parametrisation of the fluid nor do they execute a specific auxiliary function, preventing an accidental execution of the additional functionalities assigned in said extended ranges.

Figure 10:
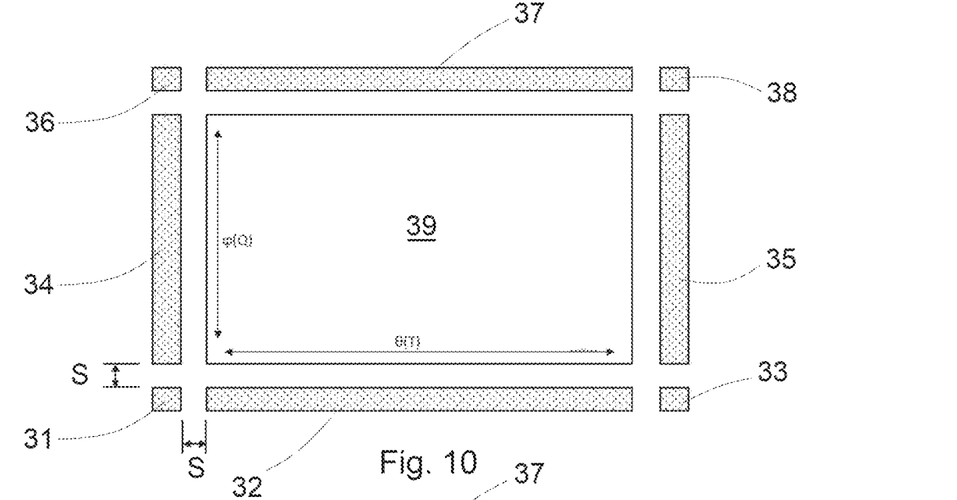
FIG. 10 is a two-dimensional representation of the positions that the handle can be in, said positions being represented with respect to the rotational position and the tilting position.
Figure 11:
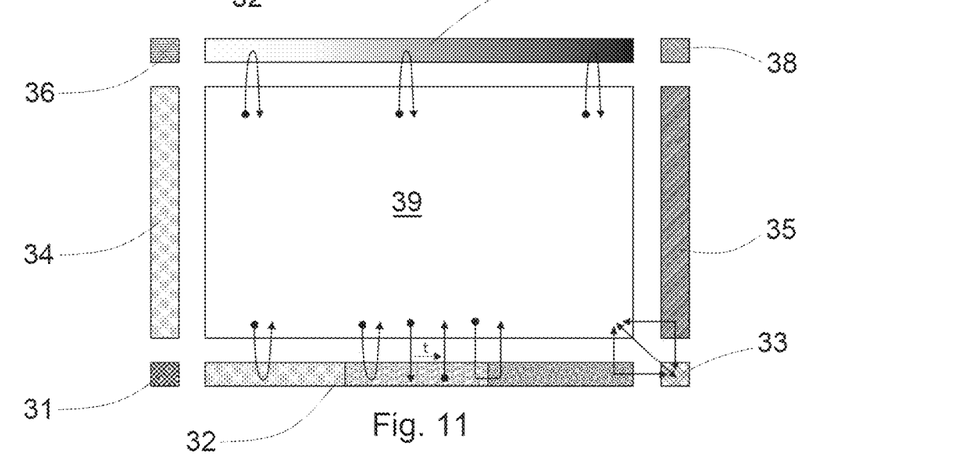
FIG. 11 is a two-dimensional representation of the positions that the handle can be in, said positions being represented with respect to the rotational position and the tilting position, with functional sub-divisions according to the entry positions to the extended ranges and showing the entry and exit options for the extended ranges by pulses, as well as the execution of the action over an extended time (t).

In this manner, as can be seen in FIGS. 10 and 11, the electronic tap (100) that contains the cartridge (10) has extended operative ranges (31, 32, 33, 34, 35, 36, 37 and 38) in each of the ends of the tilting and rotation motions of the handle (101) as well as the combined extreme positions of the tilting and rotation positions at the same time.

The method of operation of the electronic tap (100) with the cartridge (10) with extended operative ranges is programmed and governed by the electronic control system of the tap (100) that receives the measurement from the triaxial magnetic sensor (20), and performs the following steps;

- determining the position of the handle (101) in the conventional operative range (39) for which a flow value and hot and cold water mixing ratio value are assigned;
- determining the position of the handle (101) in the final area of the extended operative range (31, 32, 33, 34, 35, 36, 37 or 38) for which a flow value and hot and cold water mixing ratio value and/or an auxiliary function are assigned;
- discarding changing the previous operating features of the tap (100) if the position of the handle (100) is detected to be in one of the safety areas (S) between the conventional range area (39) and the end positions of the extended range (31, 32, 33, 34, 35, 36, 37 or 38);
- discarding the measurements that determine a position caused by rebounds in the returns of the extended areas, accidental multiple actuations or interferences/influences external to the tap (100).

The auxiliary functions are performed by the entry in the extended range areas (31, 32, 33, 34, 35, 36, 37 or 38) by a pulse or maintaining (t) the handle (101) in said area during the application of the function, optionally assigning a different auxiliary function for each type of actuation performed on the handle (101).

Entry in each of the extended range areas (31, 32, 33, 34, 35, 36, 37 or 38) can be associated with a different functionality if said are in turn divided into different subareas in the control system that detects the point of entry in the extended range, in order to provide the tap (100) with various functionalities depending on the position in one or another subarea of the extended range.

These auxiliary functions programmed in and governed by the control system of the tap (100) by sending execution commands to associated external elements can be, among others:

- the supply of a specific volume of fluid;
- the supply of a specific flow of fluid;
- the supply of fluid in a specific mixing ratio;
- the cancellation of the auxiliary functions being executed;
- the programming of operation parameters;
- the change of the default regulation range of the tap (flow, temperature);
- the selection of supply of one of the fluids supplied independently, such as purified water if the mixing system manages multiple fluids, such as mains water and purified water;
- the recalibration of passable stops and ends of range;
- the resetting of the electronic tap to factory values.

After the additional function has been activated entering the extended range by the actuation of the handle (101), and after the automatic return of said handle (101) to the area immediately adjacent to the passable stop, the exit from said adjacent area due to the actuation of the handle (101) by the user, moving it in the area (39) before the special function ends, may be used to stop said special function and dispense the mix and flow as in the normal behaviour in the conventional range area (39).

Additionally, the method of operation sends acknowledgement, reply and information signals through the processing means to the user regarding the execution of the auxiliary functions associated with the extended ranges, and with the regulation selected in the execution of the usual positions of the handle (101), by means of display means of the tap (100) itself and/or external to same, not shown in the figures, with luminous, alphanumerical and/or acoustic signals, providing the user with a visual and/or acoustic confirmation of the parametrisation selected when operating the handle (101) in both the conventional ranges and the extended ranges in which additional functions such as those described above are assigned.

Although reference has been made to a specific embodiment of the invention, a person skilled in the art will be aware that the cartridge for an electronic tap with a handle having an extended operative range for executing additional functions, as well as the electronic tap containing same and the method of operation thereof, can have numerous variations and modifications and all the details specified may be substituted by other technically equivalent ones without straying from the scope of protection defined by the appended claims.

What is claimed is:

1. A cartridge for an electronic tap with an extended operative range of motion, to which is coupled a handle or lever with a rotational and tilting motion for manual regulation of the outlet parameters of the flow in the tap in which the cartridge is installed, wherein the cartridge receives the a movement of said handle or controller through a cam that moves together with the handle or controller, characterized in that the cartridge comprises at least with:

a tilting range of motion for the cam that is connected to the handle or controller provided, at least at one of the ends of said tilting range of the cam, with a passable stop formed by an element which at a first point in a path presents a resistance to continuing in said direction of displacement, and after applying a greater force than in a usual displacement of the cam sufficient to overcome said resistance, continues moving said cam in said direction along a segment of extended path range until a non-passable end of path range, and wherein the force exerted by said resistance to overcome the passable stop continues throughout the displacement in the extended path range and is enough to return said cam to the first point in the tilting range of motion when a user ceases to act on said handle or controller;

a rotational range of motion for the cam that is connected to the handle or controller provided, at least at one of the ends of said rotational range of the cam, with a passable stop formed by an element which at a first point in a path presents a resistance to continuing in said direction of displacement, and after applying a greater force than in the usual displacement of the cam sufficient to overcome said resistance, continues moving said cam in said direction along a segment of extended range until a non-passable end of range, and wherein the force exerted by said resistance to overcome the passable stop continues throughout the displacement in the extended range and is enough to return said cam to the first point in the rotational range of motion when the user ceases to act on said handle or controller;

an electronic control system provided with at least some elements for detecting the position of the handle or controller at different points in the tilting range of motion and the rotational range of motion of each of the displacement axes thereof and also having at least some processing devices that receive the information on the position of the cam and act on the elements for regulating the mix and the flow of the fluid, as well as additional functions in the positions located within the extended ranges.

2. The cartridge for an electronic tap with an extended operative range of motion, according to claim 1, wherein an end of range stop is established by geometries of components of the cartridge other than those that perform a passable stop function, by contact between said geometries, preventing motion from continuing in said direction.

3. The cartridge for an electronic tap with an extended operative range of motion, according to claim 1, wherein the set of end of range stops for the various ends of the motion of the handle or controller is provided by geometries of the cartridge components that establish a same passable stop and/or by geometries of the cartridge components different from those establishing the passable stop function, by contact between these geometries, preventing further motion in said direction.

4. The cartridge for an electronic tap with an extended operative range of motion, according to claim 1, wherein passable stops in the tilting range of motion of the cam are terminals connected to a compression spring with a preload that requires exerting a force greater than that for moving the cam in the normal tilting range of motion to overcome the resistance to said motion caused by said spring and enter the extended range of motion, while the end of range of tilting motion stop is established by the contact between the moving disc of the cartridge that moves the cam, with a point of the cartridge that is static with respect to the movement in a plane of motion of a mobile disc.

5. The cartridge for an electronic tap with an extended operative range of motion, according to claim 1, wherein passable stops in the rotational range of motion of the cam are two terminals connected to either a spring plate or a preloaded coil spring, where each terminal is embedded in a part integrally joined to the rotation of the cam such that in its rotation, when one of said terminals contacts a stop geometry at a static part of the cartridge, a force greater than that for moving the cam in the normal rotational range of motion is required to overcome the resistance to continuing said motion provided by said spring and begin said extended range of motion, while the rotational end of range stop is established by contact between a geometry in the form of a protrusion of the piece joined to the rotation of the cam and a geometry of static walls of the cartridge that is interposed preventing continuing the motion of said protrusion.

6. The cartridge for an electronic tap with an extended operative range of motion, according to claim 1, wherein the cartridge has extended range in the two tilting directions of motion of the cam and the two rotational directions of motion of the cam.

7. The cartridge for an electronic tap with an extended operative range of motion, according to claim 1, wherein the detection elements for the position of the cam comprises, at least in the triaxial magnetic sensor placed on a static disc of the cartridge and a magnetic field generating element that moves together with the cam.

8. The cartridge for an electronic tap with an extended operative range of motion, according to claim 7, wherein the triaxial magnetic sensor is placed on a static base of the cartridge with one of the three detection Cartesian axes essentially coaxial or parallel to the axis of rotation of the handle or controller of the cartridge; and where the position of the magnetic field generating element when the handle or lever in its tilting range of motion is approximately at the middle of its range is placed essentially centred on said axis of rotation of the handle or lever of the cartridge, and therefore also essentially centred on the corresponding Cartesian axis of detection essentially coaxial or parallel to said axis of rotation of the handle or lever of the cartridge.

9. The cartridge for an electronic tap with an extended operative range of motion, according to claim 1, wherein the processing devices in the extended range areas—near the passable stop, defined as safety areas, do not determine a new parametrisation of the fluid or execute an auxiliary specific function.

10. An electronic tap, containing a tap cartridge with an extended operative range of motion as indicated in claim 1, characterized in that the handle or controller of the tap that is joined to the cam of the cartridge has extended operative ranges in the possible axes of motion of the handle or controller, and electronic detection elements of the position of said handle or controller, where the tap has operative positions corresponding to:

the conventional displacement positions of the handle in any one of the axes of motion before the resistance points at the end of each range of motion, considering this an usual area of operative range positions the extended operative range of motion positions at least in:

either an extended area corresponding to an extended range of motion of the tilting axis of the handle;

or an extended area corresponding to a position of the extended range of motion in the rotation axis of the handle; and/or an extended area corresponding to an extended range of motion of both the tilting and the rotation axes, where between the various areas of detection of the conventional positions and extended range positions there are safety areas where no fluid parametrisation or specific auxiliary function is assigned.

11. A method of operation for an electronic tap as that indicated in claim 10 containing a tap cartridge with an extended operative range of motion as that indicated in claim 1, characterised in that an electronic control system of the tap that receives the measurement of the detection elements carries out at least the following steps:

determining a position of the handle to which a fluid flow value and fluid mixing ratio are assigned if it is in the conventional operative area;

determining the position of the handle to which a fluid flow value and fluid mixing ratio are assigned, and/or an auxiliary function, if it is in the extended range end area;

discarding changing the previous operating features if the position of the handle is detected to be in one of safety areas between the conventional area-positions and the extended range end area;

discarding measurements that determine a position caused by rebounds in the returns of the extended areas, accidental multiple actuations or interferences/influences external to the tap.

12. The method of operation, according to claim 11, wherein the auxiliary functions are performed by entry in the extended range areas by means of an actuation pulse or by maintaining the handle in said area during the application of the function, optionally assigning a different auxiliary function to each type of actuation performed on the handle.

13. The method of operation according to claim 11, where each of the extended range areas is further divided into various subareas according to the entry point determined by the position of the handle or controller in a different degree of liberty to the one entering into the extended area, to provide the tap with additional functionalities according to whether the position is in one extended range subarea or another.

14. The method of operation, according to claim 11, wherein the auxiliary functions that the control system of the tap executes or sends execution commands to associated external elements are at least one or more of those described below or combinations thereof:

supply of a specific volume of fluid;
supply of a specific flow of fluid;
supply of fluid in a specific mixing ratio;
cancelling the auxiliary functions being executed;
programming operation parameters;
changing the default regulation range of the tap (flow, temperature);
selecting supply of one of the fluids supplied independently;
recalibrating passable stops and ends of range;
resetting the electronic tap to factory values.

15. The method of operation, according to claim 11, wherein the processing devices sends acknowledgement, reply and information signals to the user regarding both the execution of the auxiliary functions associated with the extended ranges, and the regulation selected in the execution of the usual positions of the handle or controller using display devices of the tap itself and/or external to it with luminous, alphanumerical and/or audible signals.

* * * * *